Dec. 28, 1954            R. A. GAISER            2,698,261
TEMPERED GLASS SHEET PROVIDED WITH A TRANSPARENT
ELECTRICALLY CONDUCTING FILM
Original Filed Nov. 10, 1949            3 Sheets-Sheet 1
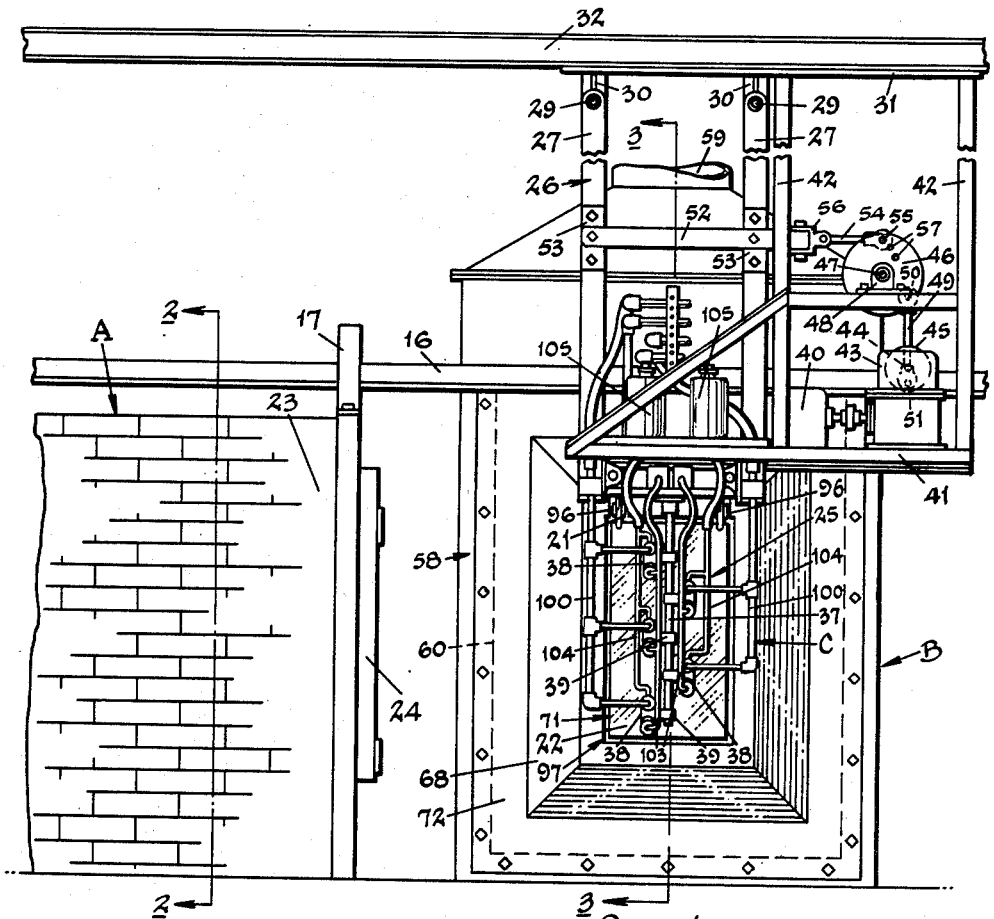
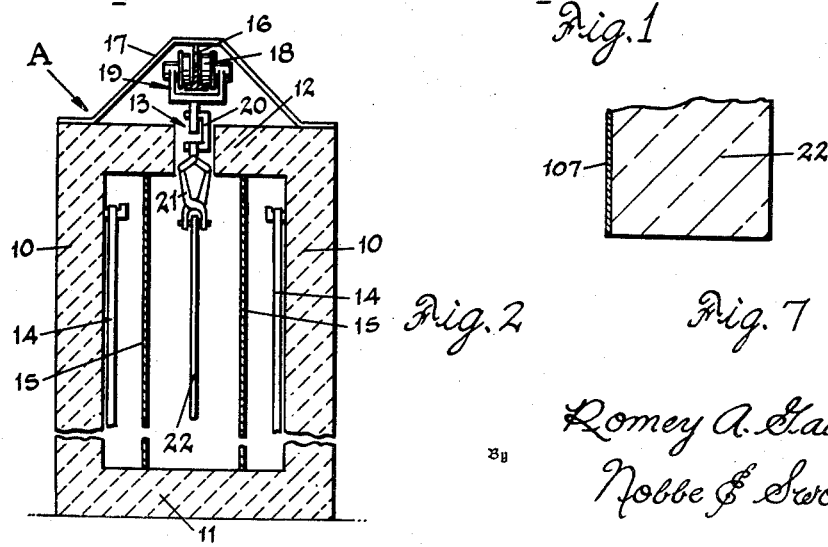
Inventor
Romey A. Gaiser
Nobbe & Swope
Attorneys

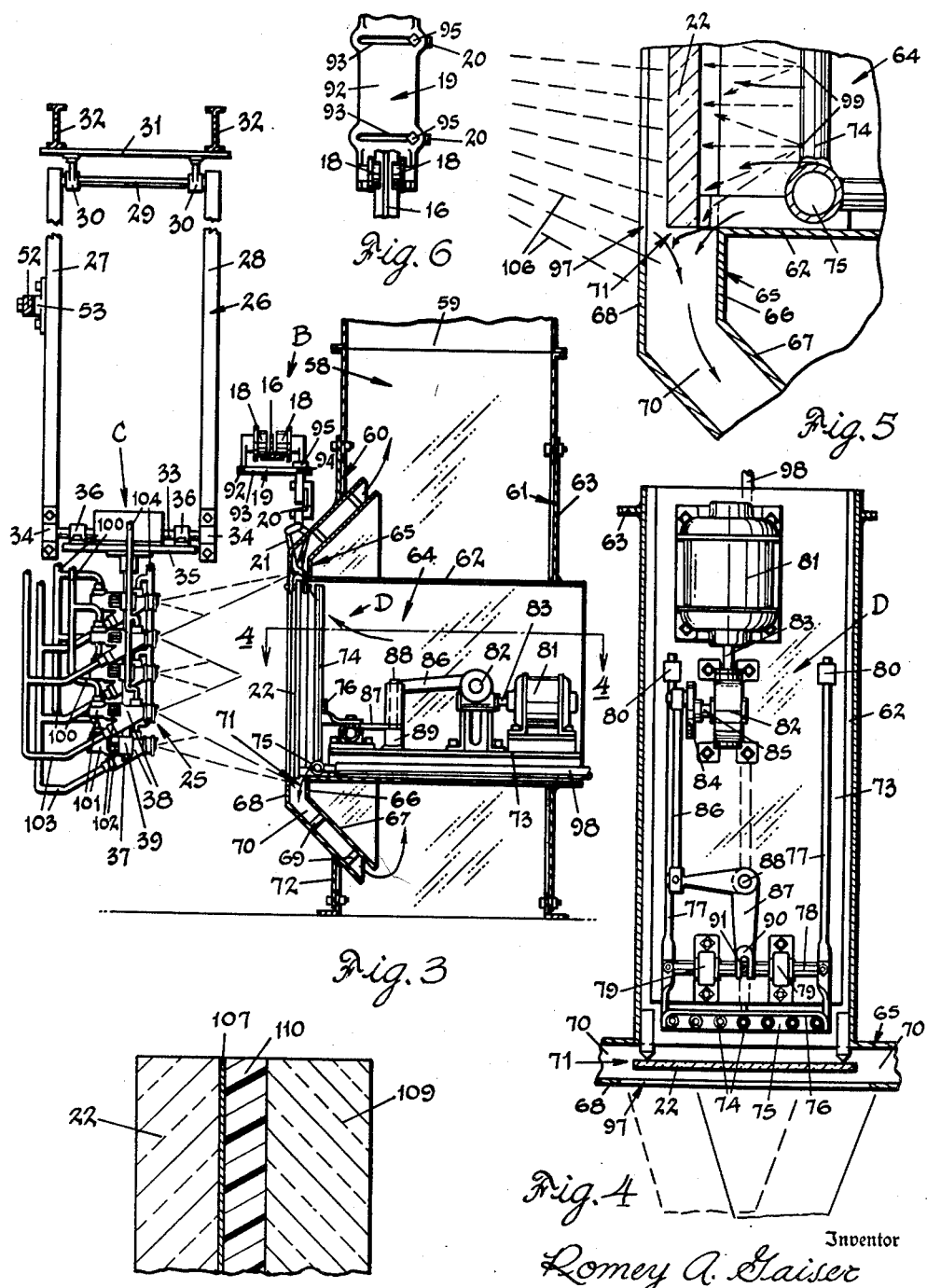

Dec. 28, 1954 R. A. GAISER 2,698,261
TEMPERED GLASS SHEET PROVIDED WITH A TRANSPARENT
ELECTRICALLY CONDUCTING FILM
Original Filed Nov. 10, 1949 3 Sheets-Sheet 3

Inventor
Romey A. Gaiser
By
Nobbe & Swope
Attorneys

United States Patent Office 2,698,261
Patented Dec. 28, 1954

2,698,261

TEMPERED GLASS SHEET PROVIDED WITH A TRANSPARENT ELECTRICALLY CONDUCTING FILM

Romey A. Gaiser, Toledo, Ohio, assignor to Libbey-Owens-Ford Glass Company, Toledo, Ohio, a corporation of Ohio Original application November 10, 1949, Serial No. 126,521. Divided and this application November 13, 1951, Serial No. 256,101

1 Claim. (Cl. 117—124)

The present invention relates to vitreous bodies provided with electrically conducting surface films. More particularly, it has to do with a specially heat strengthened glass plate having a transparent, electrically conducting film on one surface thereof.

This application is a division of my copending application Serial No. 126,521, filed November 10, 1949.

It is already known to provide a transparent, electrically conducting film (such as shown in Patent 2,429,420 to H. A. McMaster, dated October 21, 1947) on glass sheets or plates, by first heating the sheets to substantially their point of softening and then spraying one surface of the hot glass with a tin halide in fluid form; after which the filmed sheet is cooled in the atmosphere.

However, the strength and breaking characteristics of filmed glass sheets produced in this manner are little, if any, better than those of ordinary annealed glass. In fact, it is said that such filmed sheets break like poorly annealed glass.

Now, due to the expense of producing electrically conducting glass sheets of this character, it is important that they stand up under more than average rough usage, and this is particularly true because at present the widest use of these conducting sheets is in de-icing windows or windshields of airplanes, where they are subjected to very considerable abnormal strains and stresses resulting from their use at high altitudes and in pressurized cabins.

It is therefore an important aim of the present invention to produce a sheet or plate of glass that is filmed with a transparent electrically conducting film and which, at the same time, will exhibit mechanical strength and breaking characteristics under predetermined pressure loads that are as good as, if not better than, those of fully heat treated, or "full tempered" glass.

Briefly stated, this is accomplished, according to the invention, by first heating the glass sheet to substantially its point of softening, removing it from the furnace and, preferably after a few seconds delay, spraying one side of the hot sheet with a filming fluid while at the same time quickly cooling the opposite surface.

Another object of the invention is to produce a filmed and specially strengthened glass sheet by spraying one surface of a heated glass sheet with a solution containing a tin halide, or other filming material, while simultaneously blasting the opposite surface with moving streams or jets of air.

Another object is to control the thickness of the compression layers set up at opposite sides of the glass sheet by controlling the degree of cooling exerted by the filming spray on one side, and the moving air on the other, during the filming and tempering treatment.

Another object is to prevent the filming material from reacting with the surface of the hot glass sheet opposite to the surface being filmed during the filming procedure.

Other objects and advantages of the invention will become more apparent during the course of the following description, when taken in connection with the accompanying drawings.

In the drawings, wherein like numerals are employed to designate like parts throughout the same:

Fig. 1 is a side elevation of the exit end of a heating furnace, and the associated apparatus for filming and strengthening the glass after it leaves the furnace, as constructed in accordance with the present invention;

Fig. 2 is a section taken substantially along the line 2—2 in Fig. 1;

Fig. 3 is a vertical sectional view taken substantially along the line 3—3 in Fig. 1;

Fig. 4 is a horizontal sectional view taken substantially along the line 4—4 in Fig. 3;

Fig. 5 is an enlarged fragmentary, vertical sectional view showing the detail of the air blast pipes and the air exhaust means;

Fig. 6 is a fragmentary plan view of the glass supporting mechanism;

Fig. 7 is a fragmentary section through a glass sheet that has been specially strengthened and filmed in accordance with the invention;

Fig. 8 is a similar view of the glass sheet of Fig. 7, showing the usual manner of combining a glass sheet provided with a transparent, electrically conducting coating with a second sheet of glass and a plastic interlayer to form laminated safety glass;

Figure 9:
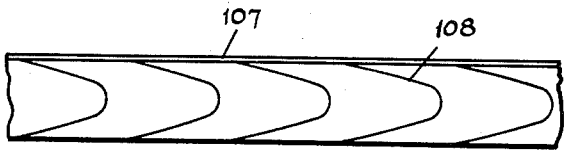
Figure 10:
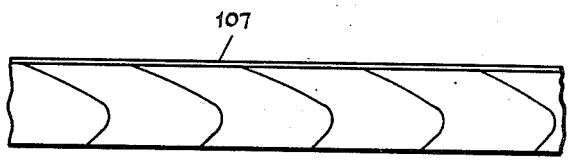
Figure 11:
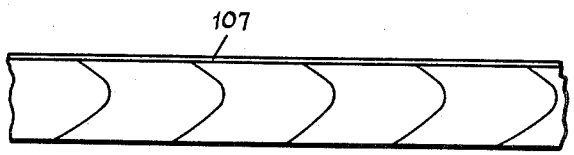
Figure 12:
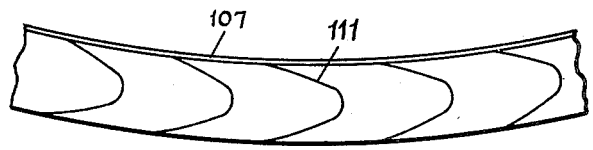

Fig. 9 is a fragmentary edge view of a glass sheet which has been subjected to substantially equal cooling on both surfaces during the filming treatment, showing diagrammatically how the strain pattern in such a sheet appears when viewed with a Babinet Compensator (this strain pattern is substantially identical with the pattern seen when a "fully tempered" glass plate is viewed in the same manner);

Fig. 10 is a similar view of a glass sheet which has been filmed without the special tempering treatment of the invention;

Fig. 11 is a similar view of a glass sheet which has been subjected to greater cooling on the unfilmed surface and lesser cooling on the filmed surface during the filming treatment; and Fig. 12 is a similar view of the glass sheet of Fig. 11 when bent under the pressure load to which such sheets are subjected in aircraft use.

Referring now more particularly to the drawings, there is illustrated in Figs. 1 to 6 a preferred form of filming and strengthening apparatus including a furnace A and a filming and strengthening mechanism B. As best shown in Figs. 1 and 2, the furnace A is of the rectangular tunnel type comprising side walls 10, bottom wall 11, and top wall 12 provided with a continuous middle slot 13. The furnace may be heated in any desired manner such as by means of electrical resistance heaters 14 along the side walls, and is preferably provided with baffle plates 15 in front of the heaters 14 to provide a more uniform heat in the working area of the furnace.

In order to move work through the furnace A and to transfer it from the furnace to the filming and strengthening apparatus B, there is provided a monorail 16, mounted above the slot 13 in the furnace A by brackets 17 and extending outwardly from the furnace to and beyond the filming and strengthening apparatus B.

Movably supported from the monorail 16 by wheels 18 is a carriage 19 provided with link members 20 extending downwardly through the slot 13 in the furnace A and carrying at their lower end tongs 21 from which a glass sheet 22 can be hung.

A glass sheet 22 to be treated, after being hung from the tongs 21 at the entrance end of the furnace (not shown), is introduced into, and passed through, the furnace A by movement of the carriage 19 along the monorail 16. The speed of travel of the carriage and the temperatures within the furnace are so controlled that by the time the sheet 22 reaches the exit end 23 of the furnace A it has been heated to substantially the softening point of the glass. The furnace door 24 is then opened and the glass sheet is moved therethrough and into position to be acted upon by the filming and tempering apparatus B.

The apparatus B includes a filming device C, positioned to one side of the path of travel of a glass sheet from the furnace, and a cooling device D, located at the opposite side of the path of travel of the glass, between which the heated glass sheet is positioned for simultaneous filming and strengthening.

The filming device C comprises a bank 25 of spray guns which are mounted for swinging, reciprocal movement in the plane of the path of travel of the glass sheet by means of a frame 26. This frame 26 includes two pairs of vertical bars 27 and 28 swingably mounted on shafts 29 which are carried by bearings 30 hung from a plate 31 secured to overhead beams 32. The lower ends of each pair of bars 27 and 28 are tied together by a shaft 33 journaled in bearings 34 carried by the ends of the bars, and the two pairs of bars 27 and 28 are tied together at their lower ends by a platform 35 which is supported from the shafts 33 by bearings 36 within which the shafts are journaled and to the bases of which the platform is bolted.

Depending from the platform 35 is a vertical rod 37 upon which the individual spray guns 38 of the bank 25 are supported. To this end, the body portion of each of the guns 38 is provided with a conventional clamping collar 39 by means of which the guns can be adjustably clamped to the rod 37 in desired vertical relation to one another and at one side or the other of the rod.

In order to cause the spray guns to reciprocate or sweep back and forth across and in a plane parallel with the glass sheet during the filming procedure, there is provided a drive means for the frame 26 which includes a motor 40 mounted on a platform 41 that is hung from the beams 32 by a framework 42. The motor 40 drives a gear reducer 43, also mounted on the platform 41, and which has keyed to its driven shaft 44 an eccentric member 45. Positioned directly above the eccentric member 45 is a vertically disposed, circular crank plate 46 rotatably mounted on an axle 47 which is carried in a bracket 48 secured to the framework 42.

The crank plate 46 has driven connection with the eccentric member 45 by means of a rod 49, secured at one end to the lower periphery of the plate 46 by a pin 50 and at its opposite end to the face of the eccentric member 45 by a pin 51; and driving connection with a cross link 52, running between and secured to the pair of bars 27 with stud and bracket connections 53, by means of a rod 54 secured at one end to the upper perimeter of the plate 46 by a pin 55 and at its opposite end by a yoke and pin connection 56 to the end of the cross link 52.

Thus, upon operation of the motor 40, the eccentric member 45 will be rotated through the speed reducer 43 to impart a crank motion to the plate 46 which in turn will cause the rod 54 and cross link 52 to be reciprocated and thus impart a swinging pendulum-like motion to the frame 26 carrying the spray guns 38. The length of the pendulum-like swing of the frame 26 can of course be made shorter or longer by moving the pin 55 which secures the end of the rod to the crank plate 46 to one of the other holes 57 in the plate.

The cooling device D, which is positioned in substantial alignment with the spraying device C on the opposite side of the path of travel of the glass sheet 22 from the furnace A, comprises a vertically arranged, substantially rectangular exhaust chamber 58 constructed of sheet metal and provided with a stack 59 leading to suitable air exhausting means (not shown). Arranged within openings 60 and 61 in the front and back walls respectively of the chamber 58 is a horizontally arranged open ended, sheet metal casing 62 extending entirely through the chamber 58 and projecting outwardly beyond the front and rear thereof. A plate 63, which is welded to the casing 62 adjacent its rear end and projects laterally from all four sides thereof, is bolted to the back wall of the chamber 58 to mount the casing in the chamber and to close the portions of the opening 61 that surrounds the casing. The passageway 64 through the casing 62 is then directly opposite to, and in direct alignment with, the spray guns 38.

Formed integrally with, or welded to, the outside of the four walls of the casing 62, at its forward end, is a laterally extending, surrounding wall 65 provided with a relatively short straight portion 66 running parallel with and outside of the side walls of the chamber 58 and a relatively longer portion 67 angled rearwardly toward and extending into the chamber 58 through the opening 60 in the front wall thereof. A correspondingly shaped, laterally extending wall 68 is positioned in spaced parallel relation to the wall 65 by spacer blocks 69 to provide a passageway 70 leading from an area 71, outlined by the walls 65 and 68, directly in front of the casing 62, to the interior of the exhaust chamber 58. A cover plate 72 which is similar to the cover plate 63 is welded to the wall 68 to support the same and to close the portion of the opening 60 surrounding the casing 62. This construction permits the wall 68 to be readily removed from association with the casing 62, for reasons to be more clearly hereinafter set forth, while, at the same time, assisting in supporting the casing 62 within the chamber 58.

The means for cooling the glass sheet 22, when in filming and strengthening position, is carried by a base 73 located on the bottom wall of the casing 62, and may comprise a plurality of vertically arranged, spaced, cooling pipes 74 connected to a header 75 and positioned adjacent the forward end of the casing. The pipes 74 are held together as a unit by a strap 76 secured to the backs of the several pipes and curving around the two end pipes; and are mounted for lateral reciprocatory movement within the casing 62 upon rearwardly extending flexible rods 77, the forward ends of which are secured to the ends of the strap 76. The rods 77 are mounted, adjacent their forward ends, on opposite ends of a shaft 78 slidable within brackets 79 secured to the base 73; and the rearward ends of the rods are fixed in blocks 80, also secured to the base 73.

In order to impart the desired reciprocatory movement to the pipes 74 there is provided a motor 81 mounted on the base 73 and having driving connection with a gear reducer 82 through the motor drive shaft 83 to drive an eccentric 84 carried at the end of the driven shaft 85. The eccentric 84 is operatively connected, by means of a rod 86, with one end of a horizontally arranged bell crank 87 which is mounted on a vertical shaft 88 extending upwardly from a bracket 89 fixed to the base 73. The opposite end of the bell crank 87 has a forked portion 90 which surrounds a pin 91 extending upwardly from the shaft 78 midway its ends.

Upon operation of the motor 81, the eccentric 84 will be rotated, and the movement of the eccentric will be translated through the rod 86 and bell crank 87 to the shaft 78 causing it to slide back and forth within the brackets 79 and thus rapidly reciprocate the pipes 74 within the casing 62 against the flexibility of the rods 77 which act as spring levers to accelerate the reversal of movement of the shaft 78.

With the particular construction of cooling means D as shown in the drawings, and which includes the laterally extending walls 65 and 68, it is necessary that the glass sheet be moved laterally to bring it into proper position for filming and cooling after it has been moved along the monorail 16 from the furnace A and into position between the devices C and D. To this end, the carriage 19 includes a horizontal supporting plate 92 provided with transverse slots 93. The link members 20 are supported from the supporting plate by pins 94 passing through the slots 93 and which are provided with heads 95 that engage the upper surface of the plate 92.

During movement of the carriage 19 to carry the sheet through the furnace and to bring it into position between the spraying device C and the cooling device D, the pins 94 are preferably midway of the ends of the slots 93 and directly below the monorail 16 in order to balance the glass sheet suspended therefrom on the carriage. Then, as the carriage arrives in front of the cooling device D, the pins 94, carrying the link members 20, are moved in the slots 93 toward the casing 62 until the tongs 21 enter slots 96 in the wall 68 (Fig. 1) and the sheet 22 passes through the opening 97 in the wall 68 and is positioned between the walls 65 and 68 directly in front of the opening through the casing 62 (Fig. 3), whereupon the hot glass is ready for final treatment.

I prefer to allow a time lapse of several seconds between the time the glass sheet 22 is removed from the furnace and the time when it is subjected to the action of the filming spray and the cooling air, because I have found that such a time interval has an important bearing on the finished filmed and tempered sheet.

With the glass sheet in position for filming and cooling, the motor 81 is started to reciprocate the pipes 74 back and forth across and in close proximity to the rear surface of the glass sheet 26. Simultaneously, compressed air is fed to the header 75 through a flexible conduit 98 connected thereto and leading to a source of supply (not shown), which air is distributed to the several pipes 74 and forced out against the surface of the glass through vertically spaced openings 99 therein. This results in the rear surface of the glass being quickly chilled by moving blasts or jets of air impinging on and sweeping over its surface.

At the same time, the cooling is begun, or preferably, immediately afterward, the motor 40 is started to swing the spray guns 38 back and forth across the front surface of the sheet 22. Simultaneously, the guns 38 are turned on by admitting air through pipes 100 into an air cylinder 101 in the body of each gun to retract the piston rod 102, connected to the conventional needle valve (not shown) of the gun, and which valve is normally held closed by spring pressure. Opening of the needle valve permits air under pressure which is supplied to the guns through pipes 103 to atomize the spraying liquid, fed to the guns through pipes 104 from containers 105 on the stationary platform 41, and to blow it outwardly against the sheet 22.

It will be noted that the opening 97 in the wall 68 is of the same size and shape but slightly larger than the area of the sheet 22. This is important in connection with the spray filming of the sheet and in the removal of the surplus spray with the special exhausing apparatus shown. For this reason, in treating sheets of different sizes and shapes, it is desirable that a correspondingly sized and shaped opening be provided in the wall 68. This can readily be done by removing the cover plate 72, which carries the wall 68, from the chamber 58 and replacing it with a different cover plate carrying a wall which has the desired size and shape of opening.

Heretofore, considerable difficulty has been experienced, in spraying glass sheets to produce electrically conducting films, because of the fact that some of the surplus spraying liquid that is being applied to one surface of the sheet is inadvertently deposited on the opposite surface which it is not desired to film.

According to the present invention, there is provided a special type of suction apparatus which immediately removes surplus spray from the scene and effectively prevents filming of the rear or unsprayed side of the glass under all circumstances.

Specifically, this suction means comprises the spaced walls 65 and 68 which form the passageway 70 leading from the area 71 in which the sheet to be treated, and the exhaust chamber 58 into which the passageway 70 discharges.

Since air is being continuously exhausted from the top of the chamber 58, through the stack 59, a draft will be set up through the passageway 70 to continuously pull a stream of air from all four sides of the area 71 around the glass sheet 22 as best shown by the arrows in Fig. 5. Consequently, any surplus of the spray 106 to the sheet 22 will be immediately entrained in the flow of air moving into the passageway 70 and exhausted through the stack 59. At the same time, because the sheet 22 substantially closes the opening 97 in the wall 68, a stream of air will be pulled in through the opening in the casing 62 against the rear surface of the glass sheet.

This continuous wash of air over the sheet surface and toward the edges thereof further assists in preventing any film formation on this rear surface and, even when the blower pipes 74 are not used, will still act to chill the heated glass by the impact of moving air in contact therewith and thus impart some tempering action to this surface of the sheet. However, in order to obtain full strength and best breaking characteristics, I prefer to chill the rear surface of the sheet by air blasts from the reciprocating pipes 74. Moreover, the washing action of the air from these pipes is so effective in preventing film formation on the rear surface of the glass that the special exhausting means can be eliminated, if desired, when the air pipes 74 are used After the glass sheet 22 has been positioned within the area 71 and sprayed with filming solution on one side and blasted with air on the other for a sufficient length of time to produce the required film on one surface of the sheet and the desired degree of temper in the glass, the link members 20 are again moved back to the middle of the carriage 19 and the carriage moved to the right along the monorail 16 to unloading position (not shown), where the sheet 22 which is now provided with a film 107 (Fig. 7) can be removed from the tongs 21 and is ready for use.

It will be understood that many, if not all, of the features of the present invention will be valuable for use in connection with the production of any number of different kinds of sprayed films. However, to date, the invention has found its greatest commercial value in the production of glass sheets or plates filmed with a transparent, electrically conducting coating of the general type disclosed in the patent to Harold A. McMaster, 2,429,420, granted October 21, 1947.

To illustrate the technique, in a preferred manner of filming and strengthening a 14 x 16 inch plate, .200 of an inch thick, according to the present invention, the sheet is heated in a 1200° F. furnace for 3.25 minutes and is then positioned between the filming and chilling apparatus. The time interval between removal of the glass from the furnace, and the application of filming solution to one side of the heated plate and air to the other, is scheduled to give a definite time lag between these two operations. In the present commercial production of this particular light, the time lapse between the heating and the spraying and tempering operations has been set at 5 seconds, plus or minus one second.

A spray solution of 10% stannic chloride in isopropyl alcohol by volume is employed, and one side of the sheet is sprayed with this solution at the rate of 600 to 800 cc. per minute while at the same time an air blast is applied to the opposite side or surface of the glass from the reciprocating air pipe mechanism. The air pressures used are approximately 50 pounds per square inch for the spray solution and approximately 90 pounds per square inch for the air blast. With glass of this size I locate the reciprocating pipe mechanism approximately 6 inches from the glass surface and the spray gun heads approximately 8 to 10 inches from the glass surface.

Obviously different temperatures and heating times, in the furnace, as well as different pressures of air and spray, and different spacings of air and spray mechanisms, may, and often are, used in treating lights of other size, shape and/or thickness in order to produce the desired end result. Moreover, all of these factors can be varied relative to one another in a manner to still produce the same result.

Different filming fluids can also be employed, such as solutions of various tin halides, and even vapors of filming materials such as stannic tetrachloride, stannic tetraiodide, stannic tetrabromide, etc., all of which can be sprayed on hot glass to produce transparent, electrically conducting films. Furthermore, non-filming fluids in liquid, semi-liquid, or gaseous form can be used instead of air to chill the unfilmed surface of the glass. Examples of these are steam, oil and mists of water-oil emulsions.

The important points are, when transparent, electrically conducting films are to be produced, that the glass be heated to substantially its point of softening, that the two surfaces of the heated sheet be treated substantially simultaneously, one by a moving, non-filming fluid, and the other by moving sprays of filming fluid for a sufficient length of time to produce the desired thickness of film on one surface and the desired degree of temper at both surfaces, and, preferably, that there be a definite time lapse between the heating, and the filming and final strengthening treatments.

As explained above, by the technique of this invention, it is possible to produce a filmed sheet or plate of glass having as great and, in some cases greater, mechanical strength in use than fully tempered plate glass. Fully tempered plate glass has been generally considered the strongest form of tempered glass, and is produced by first heating the glass to substantially its point of softening and then rapidly and uniformly chilling the opposite surfaces thereof to place the exterior of the plate under compression and the interior under tension. Glass plates treated in this manner have their mechanical strength greatly increased, and are also given a predetermined breaking pattern so that, if and when broken, they will not splinter like ordinary glass plates but will disintegrate uniformly into innumerable tiny fragments which resemble the crystals of rock candy.

In other words, the added strength and desirable breaking characteristics of this glass are the result of intentional and carefully controlled strains that are set up in the glass by the tempering procedure and, when the edge of such tempered glass sheets is viewed with a Babinet Compensator the strain pattern will appear as shown at 108 in Fig. 9, and the exposed surfaces of the glass will be in compression, balanced by the tension inside.

As explained above, when electrically conducting films are applied by the procedure heretofore generally employed, and in which the heated glass is sprayed with filming liquid on one side only, with the other side exposed to substantially quiescent air at room temperature, its strength and breaking characteristics were similar to those of poorly tempered glass. I have discovered that this is due to the fact that strains are introduced into the glass by the spraying procedure and that such strains are non-uniform and result in a much thicker compression layer on the filmed side of the glass than on the unfilmed side, as shown in the stress diagram for a sheet filmed in this manner in Fig. 10.

This is, of course, undesirable, but it is especially so in the case of glass sheets filmed with an electrically conducting coating which have found their greatest commercial use in the glazing of aircraft. Thus, for this purpose it is desirable to combine the coated sheet together with at least one other sheet of glass 109 and an interposed layer of plastic material 110 into a laminated structure (Fig. 8). When this is done, it is considered necessary to place the coated sheet with the electrically conducting film 107 to the inside, and in contact with the plastic interlayer, as shown in Fig. 8, in order to avoid the possibility of shocks from and short circuits in the film, and to locate the filmed sheet 22 as the outboard light to obtain the most effective de-icing action. Consequently, the side of the glass having the thinnest compression layer is placed in tension during pressurization and fails at below the required levels.

According to the present invention, however, the heated glass sheet which has one surface chilled by the filming spray may at the same time have its opposite surface chilled in the same degree by blasts of cooling air from the reciprocating air pipes 74. This results in a filmed and strengthened sheet having a stress pattern as shown in Fig. 9. Or, in other words, one that is substantially the same as fully tempered glass, and in which the compression layers on the opposite sides are of equal thickness. When treated in this manner, the resultant filmed sheet will have a mechanical strength, and predetermined breaking characteristics that are substantially identical with that of fully tempered plate glass.

As a modification of the invention, the filmed sheet may be given a mechanical strength, under certain conditions, that is actually greater than that of fully tempered glass under the same conditions.

To illustrate, during the filming and strengthening treatment, the rear or unfilmed surface may be chilled to a greater degree than the surface being filmed. This can be accomplished by starting the air blast against the rear surface before starting the spraying of the front surface, by increasing the volume of cooling air blasted against the rear surface, by the use of lower air temperatures, etc.

However, accomplished, the resultant filmed sheet will have a stress pattern as shown in Fig. 11, in which the compression layer on the unfilmed side is thicker than the compression layer on the filmed side. Now when such a filmed sheet is mounted in an airplane in the conventional manner, that is, with the filmed side of the sheet toward the inside of the plane, and, in the case of laminated safety glass, towards the inside of the lamination, the glass will, under pressurization, bend in the direction shown in Fig. 12.

When so bent, the applied stress combined with the internal stress will give the distribution shown by the strain lines 111 in Fig. 12, where the compression of the opposite surfaces is equal and is balanced by the tension inside the sheet. Consequently, the stress diagram of this particular filmed sheet, under load, will be the same as the stress pattern of a fully tempered glass plate when not under load (Fig. 9), with the result that a light so treated exhibits maximum mechanical strength under pressurization and so is stronger than a fully tempered plate under such conditions.

It is to be understood that the form of the invention herewith shown and described is to be taken as an illustrative embodiment only of the same, and that various changes in the shape, size and arrangement of parts, as well as various procedural changes may be resorted to without departing from the spirit of the invention or the scope of the subjoined claim.

I claim:

As a new article of manufacture, a sheet of glass having compression layers on opposite sides thereof and its interior under tension, and a transparent electrically conducting film on one surface of said sheet, said sheet being further characterized by the fact that the compression layer on the unfilmed side thereof is thicker than the compression layer on the filmed side.

References Cited in the file of this patent

UNITED STATES PATENTS

| Number | Name | Date |
| --- | --- | --- |
| 2,194,611 | Paddock et al. | Mar. 26, 1940 |
| 2,236,911 | Long | Apr. 1, 1941 |
| 2,311,846 | Littleton et al. | Feb. 23, 1943 |
| 2,564,707 | Mochel | Aug. 21, 1951 |
| 2,584,859 | Gaiser | Feb. 5, 1952 |